March 6, 1973             E. I. VALYI             3,719,735
METHOD FOR MOLDING PLASTIC CONTAINERS
Filed Dec. 21, 1970
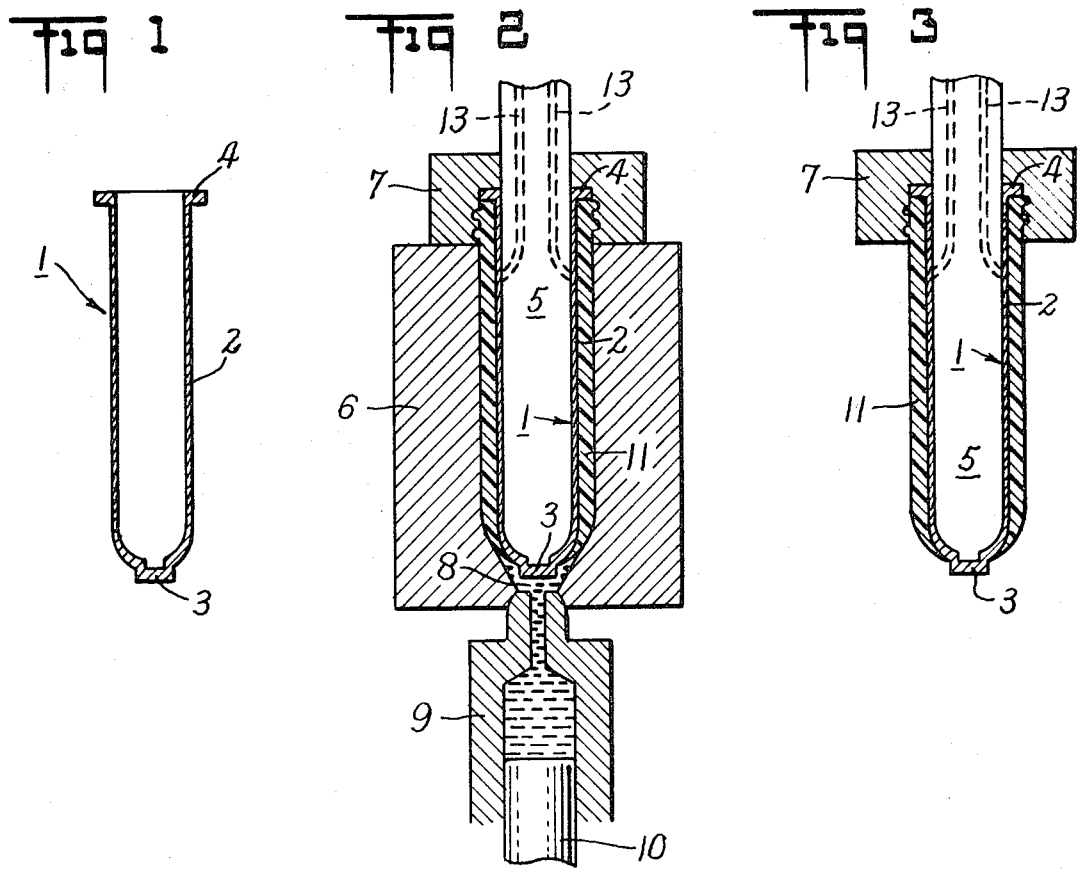
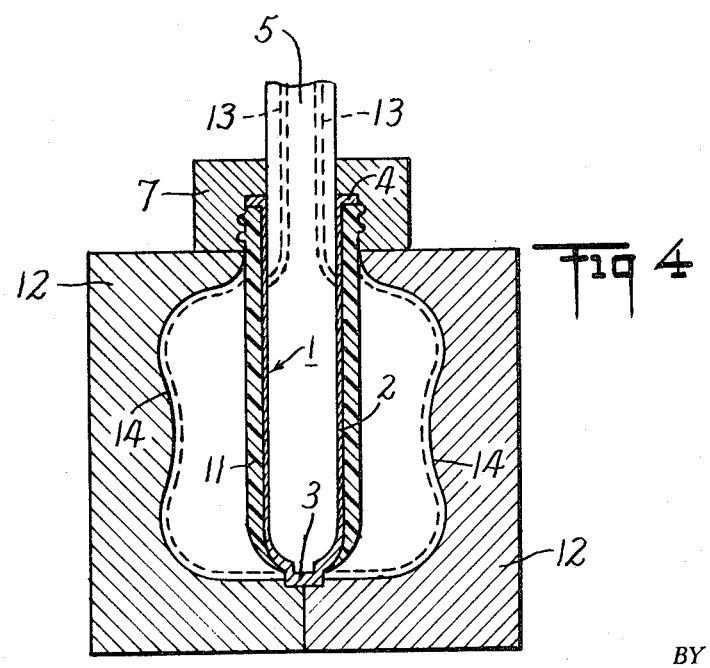
INVENTOR.
Emery I. Valyi
BY
N. L. Leek
ATTORNEY United States Patent Office 3,719,735
Patented Mar. 6, 1973

3,719,735
METHOD FOR MOLDING PLASTIC CONTAINERS
Emery I. Valyi, 5200 Sycamore Ave.,
Riverdale, N.Y. 10471
Filed Dec. 21, 1970, Ser. No. 100,050
Int. Cl. B29c 9/00, 17/04, 17/07; B29d 3/02
U.S. Cl. 264—89
16 Claims

ABSTRACT OF THE DISCLOSURE

Method for pressure molding a parison to be subsequently blow molded. A relatively thin sleeve of plastic corresponding to the shape of the blow core is placed over the blow core prior to molding the parison therearound to insulate the blow core from the temperature of the molten plastic to protect the blow valve from clogging and the blow core from erosion by the plastic during the molding step.

---

This invention relates to a method of blow molding hollow articles of organic plastic material from parisons made by pressure molding, such as by injection molding or compression molding. In the said method the parison is molded in a parison mold around a blow core. The blow core is then removed together with the parison from the parison mold to a blow mold while the latter is still deformable and the parison is expanded into conformance with the blow mold by applying fluid pressure through the blow core to the inside of the parison.

Injection blow molding has many advantages compared to other processes for the production of hollow plastic articles, such as the high dimensional accuracy of the product, the versatility of the process as to the variety of materials processed and its ability to make finished articles without the need for subsequent operations. It also exhibits difficulties that are related to the production of the parisons, as for example described in my paper entitled "Tools for Injection-Blow Molding," published in the SPE Journal, vol. 23, No. 7, pp. 38–41, July 1967.

An object of the invention is to provide an improved method for the production of parisons.

A further object is to render the operation of blow cores used for making such parisons simple and reliable.

Another object is to improve the control of the dimensional accuracy and of the temperature of parisons.

It has been recognized that the quality of blown hollow articles made from pressure-molded parisons depends in large measure upon the dimensional accuracy of the parison immediately preceding the blowing step and upon the predetermined distribution of its temperature. Such dimensional accuracy and temperature distribution are difficult to control, particularly when the parisons to be molded are long in relation to their diameters, the respective ratio for example exceeding 2.5:1. The dimensions and the temperature of the parison are largely determined by the mold in which it is made and particularly by the blow core. The blow core is subject to rapid movement over appreciable distances in the course of each molding cycle. Its dimensions are frequently not sufficient to accommodate efficient means for the control of its temperature and to resist the pressure of the plastic during injection without deflecting. The choice of materials from which blow cores may be made is limited by the need to withstand the erosive action of the plastic during repeated molding cycles to tool steels and the like which do not have sufficient heat conductivity to facilitate temperature control. In addition, the fluid orifice of the blow core must be prevented from clogging and thereby adversely influencing the expansion of the parisons.

It has been attempted in the past to overcome these difficulties caused by blow cores. Thus, my U.S. Pat. No. 3,526,687 aims at the prevention of clogging of the blow orifice. U.S. Pat. 3,305,892 describes a procedure for molding parisons while stabilizing the blow cores to prevent their deformation. U.S. Pat. No. 3,339,231 shows procedures for controlling the temperature of blow cores. These and other procedures in the art, while overcoming some of the difficulties that are encountered, necessitate the use of complicated apparatus that does not always function reliably and increases the cost of the process of injection blow molding.

In accordance with the present invention, the blow core is protected from the influence of the hot plastic that is brought into contact with it at high pressure in the course of the parison molding step by covering it every time before a parison is made with a closely fitting sleeve that is compatible with the plastic from which the parison is made. The sleeve insulates the blow core from the heat of the plastic which would otherwise come into direct contact with the blow core and also protects the blow orifice from the penetration and, therefore, from the clogging by molten plastic. The blow core, surrounded by the sleeve, may be supported by holding it in pressure contact with selected areas of the parison mold. The hole or holes thereby produced in the injected parts of the parison do not result in discontinuities in the parison, because they are closed by the corresponding areas of the sleeve. Thus, the blow core may be supported without damaging the parison.

The nature of the invention will be better understood from the following description, taken in connection with the accompanying drawings in which a specific embodiment has been shown for purposes of illustration.

In the drawings:

FIG. 1 is a longitudinal section of a sleeve adapted to surround a blow core;

FIG. 2 is a longitudinal section with parts in elevation of a parison mold showing the blow core covered by a sleeve;

FIG. 3 is a similar view showing the blow core retracted from the parison mold with the parison thereon; and FIG. 4 is a similar view showing the blow core in blow position within the blow mold and the hollow article in the blow mold cavity.

Referring to the drawings more in detail, FIG. 1 shows a sleeve 1 for the blow core to be used in the subsequent molding operation, having an inner surface closely approximating the outer surface of that blow core. The thickness of the sleeve may vary; thus, its side walls 2 may be very thin, such as between 0.001 inch and 0.020", while its bottom 3 may be twice to ten times as thick as the side walls and have a shape adapted to provide alignment with the parison mold. The rim 4 of the sleeve may conform to the top region of the hollow article to be made. Such sleeves may be produced from a variety of plastics at reasonable cost, by methods well known in the art, such as for example by thermoforming, powder coating, casting, these methods being described on pages 534; 594; and 602, respectively, of the 1969–1970 Modern Plastics Encyclopedia, published by McGraw-Hill Inc.; and by other methods well known in the art of manufacturing thin-walled, shaped articles of plastic.

The sleeves shown in FIG. 1 are used in a parison mold according to FIG. 2 which consists of blow core 5 and a parison mold 6 and a tool for the forming of the open end of the hollow article, the neck ring 7. A passage 8 connects the parison mold 6 with a supply of hot plastic contained within cylinder 9 from which the molten plastic may be pressed into parison mold 6 by piston 10 under sufficient pressure to effect rapid filling of the space between the blow core 5 and the parison mold 6 and the space within neck ring 7 communicating with the parison mold.

The parison 11 molded in the apparatus shown in FIG. 2 may be removed from the parison mold 6 together with the blow core 5 and the neck ring 7, as shown in FIG. 3 and inserted into a blow mold 12. Pressure fluid obtained from a source not shown may be admitted through fluid passages 13 to the interior of parison 11. The blow mold 12 has a mold cavity 14 corresponding to the shape of the hollow article to be made and it may be made of two halves which are separable to facilitate the removal of the finished article to be made therein.

The above indicated movements of the blow core may for example be carried out by apparatus shown in U.S. Pats. Nos. 2,298,716; 3,100,913; 3,183,552; and in my U.S. Pat. No. 3,029,468. In any such apparatus, one or more blow cores may be used simultaneously and they may be moved from one operating position to another individually or in groups of several blow cores.

In operation of this method, sleeves according to FIG. 1 may be produced by any of the procedures referred to before, independently of the injection blow molding operation here described. Alternately, sleeves may also be fashioned in place, as for example by wrapping plastic film stock tightly around the blow core 5. The sleeve material must have deformation characteristics that equal or exceed those of the parison material, at the temperatures normally maintained for expanding the parison into the blow mold cavity 14.

The material of the sleeves has to be compatible with the material of the parison 11 and not interfere with the function of the hollow article to be made from the parison. Accordingly, the material of the sleeve must be capable of bonding firmly to the material of the parison at the temperature normally used for injection molding the latter material, such as by fusing thereinto or by alloying therewith. To facilitate such bonding, the outside surface of the sleeve 1 that is to come into contact with the injected plastic of the parison 11 may be treated by procedures that are known in the art to promote the adhesion of plastic surfaces. For example, if the sleeve is to be made of polyethylene, its outside surface may be flame treated; in other instances, it may be rendered tacky by application of a solvent prior to parison injection.

Whenever the material of the sleeve is the same as that of the parison to be injected, the above requirements are of course readily met. If the material from which the injected portion of the parison is to be made does not lend itself to the economical manufacture of sleeves, or if it is required that the finished article have the combined properties of more than one plastic, then the sleeve material necessitated by these conditions may nevertheless be coated with the same material as the one to be injected into the parison, or otherwise treated to facilitate its adhesion to the latter, unless it is by itself compatible therewith.

Sleeve 1 need not be made of a single material. For example, the sleeve side walls 2 may be made of a material that is different from the material in the sleeve bottom 3 which may, at times, be provided with a reinforcement for better support of the parison.

Although the sleeves will in most instances be made of plastics, it is also possible to make them of other materials, such as for example of extensible metal foil, or of elastomers.

The sleeve 1 which fits snugly over the blow core 5 is placed thereover by hand, or by mechanical means, not shown, before the blow core is inserted into the parison mold 6. When in place within the parison mold, the tip of the blow core, surrounded by the bottom 3 of the sleeve may be held firmly against the inner wall of the parison mold, whenever it is desired to stabilize the blow core.

After the blow core is in place, hot plastic is injected into the parison mold through orifice 8 under action of piston 10 operating in pressure cylinder 9. After injection, the hot plastic surrounds the sleeve 1 under pressure. Due to the intimate contact established thereby between the hot plastic and the exposed surface of the sleeve, the sleeve is rapidly heated until its temperature approaches that of the injected plastic. At that temperature, adhesion of the two materials occurs readily and the material of the sleeve is moreover heated throughout sufficiently to render the sleeve deformable at the same rate as the injected plastic. Accordingly, the sleeve unites with the injected plastic and combines with it to form the composite parison 11.

After it is placed over the blow core 5, the sleeve 1 may cover the fluid passages 13 which are accordingly protected from the entry of any plastic as it is injected in the course of parison molding. Therefore, it is not necessary to provide mechanism for closing the fluid passages 13 at any time, thereby simplifying the construction of the blow core and rendering its operation more reliable.

During the injection step, the blow core 5 is insulated from the hot plastic and protected from the friction of the plastic flowing at high velocity and pressure around the blow core. Therefore, it is not necessary to provide temperature control means to adjust the temperature of the blow core after repeated injection of plastic, as is the present practice.

It is at times beneficial to heat the sleeve prior to expansion by blowing, from the inside as well as from the outside by the freshly injected plastic of the parison. This may be readily accomplished by constructing the blow core of a metal that is a good conductor of heat, such as aluminum, since it does not have to withstand the erosive effect of the plastic during injection; and by heating the blow core electrically instead of by fluid circulation, as is now necessary.

In order to prevent deflection of the blow core by the injected plastic and thereby to prevent undesirable variation of the parison wall thickness, the blow core 5 may be firmly pressed against the bottom of the parison mold, as shown in FIG. 2. Due to the sleeve that surrounds the blow core, only the sleeve will in fact be in contact with the parison mold. Since no plastic can flow into the area of such contact, a discontinuity is produced in that area, which corresponds to the bottom 3 of the sleeve. The sleeve may be made to have a thickness at bottom 3 corresponding to the desired thickness of the finished hollow article at that location. In the region immediately adjacent the area of contact between the sleeve and the parison mold, the sleeve is firmly attached or fused to the parison.

After forming of the parison by injection and the joining of the sleeve to the injected plastic, the blow core 5 is removed from the parison mold together with the neck ring 7 and with the parison 11 thereon, as shown in FIG. 3. It is next inserted into the blow mold 12, shown in FIG. 4.

For accurate location of the blow core 5 in the blow mold 12, the blow core may be pressed against the bottom of the blow mold, with the sleeve bottom 3 therebetween. Thus, the blow core is maintained in alignment in the blow mold, the same as it was in the parison mold. As the next step, pressure fluid, usually compressed air, is admitted into the parison through fluid passages 13 and the parison is expanded into the blow mold 12, to assume the shape of the blow mold cavity 14, as indicated by dotted lines in FIG. 4. Fluid pressure is maintained until the blown article cools sufficiently in contact with the walls of the blow mold 12, to be removed therefrom.

In addition to the advantages heretofore mentioned, the use of a sleeve in conjunction with the blow core also provides the possibility of producing a hollow article having the properties of more than a single plastic, in combination. This is readily accomplished by selecting the material of the sleeve so as to have one of the properties that the finished article is to have, and the material of the injected plastic so as to have another of the properties desired. Since the sleeve may be produced by thermoforming, as previously described, in which process plastic film is converted into the shape of the sleeve; and, since plastic film may be produced as a lamination of several film layers having different properties, the sleeves made from such laminated films have the combined properties of the several plastics that are used to produce such laminated film. Accordingly, the parisons and the blown articles produced therefrom will exhibit the properties of the several plastics of which the said laminated film is composed, as well as the properties of the plastic injected around the sleeve.

One of the reasons for providing the finished article with properties that no single plastic possesses may be to produce a container, the bulk of which is for example composed of a material that is inexpensive, such as polystyrene, but at the same time exhibits insufficient resistance to the transmission of gases, such as oxygen or carbon dioxide. In such an instance, the sleeve 1 may be made to contain an uninterrupted layer of polyvinylidine chloride, a plastic with great resistance to the transmission of the gases mentioned above. To facilitate the handling of polyvinylidine chloride in the course of its conversion into the shape required for the sleeve and in the course of its application to the blow core, as herein described, it is useful to laminate it between layers of polystyrene, or polyethylene, or other plastics that are convenient to form and to handle.

Other reasons for the use of laminated sleeves are to provide additional combinations of properties, such as solvent resistance, resistance to gas transmission and the ability to bond readily to the plastic molded around the sleeve. Such a combination may be obtained, for example, by making the sleeve from a laminated film composed of layers of polyethylene, polyvinyl chloride, polyvinylidene chloride and polystyrene and surrounding the sleeve with polystyrene in the course of parison injection. Many of the plastics that have good gas barrier or solvent resistance properties are too expensive for the production of rigid walled commercial containers, such as for example, acetal polymers, ionomer resins, polyallomer copolymers, polycarbonates, polypropylene, polyvinylidene chloride, acrylonitrile and methacryl-nitrile polymers, nylon and others, while other plastics, such as polystyrene and polyethylene are inexpensive, but do not have sufficient barrier or solvent resistance properties. In such instances, only the sleeve which contains relatively little material, is made of the more expensive plastic, while the bulk of the container is made of the inexpensive plastic that lacks the properties provided by the other or others.

Whenever the material of the sleeve is to be relied upon to provide a gas transmission or solubility barrier inside the finished container, it is important to know whether the material so relied upon is indeed present throughout the area to be protected. In order to inspect the finished article in keeping with this requirement, the sleeve may be made of a material that is colored differently than the material injected around the sleeve, whereby the latter is also made transparent or translucent. In this manner, any discontinuity in the protective sleeve material may be readily discovered in the finished article, by optical inspection.

Alternatively, the two materials may be made to differ as to their radiation transmission properties, such as for example, ultraviolet radiation and the corresponding inspection effected by known means to detect the respective radiation intensity.

It is also possible to produce finished articles having desirable appearance by providing different colors and degrees of transparency in the sleeve and in the material that is injected around it.

What is claimed is:

1. In the method of making a hollow article of organic plastic material wherein a parison is formed on a core in a parison mold by molding the organic plastic material around the core in the parison mold cavity and wherein the parison is subsequently expanded in a blow mold, the improvement which comprises forming an inner sleeve of organic plastic material, placing said sleeve on said core, said sleeve having substantially continuous side and end portions which conform to the sides and end of the core and prevent direct contact between the core and plastic being molded therearound, subsequently pressure molding an outer layer of organic plastic material around said sleeve, substantially enclosing said sleeve and adhering thereto, to form a composite parison, bringing said inner sleeve to a temperature at which it is capable of being expanded together with said outer layer, at least in part by means of said outer layer, introducing said inner sleeve and outer layer into a blow mold in said heated state, and expanding said sleeve and layer in unison in a blow mold to form a multilayered hollow article.

2. The method set forth in claim 1 in which the sleeve is formed from a film of organic plastic material.

3. The method set forth in claim 2 in which the sleeve is thermoformed from the film.

4. The method set forth in claim 1 in which the sleeve is formed from a powder of organic plastic material.

5. The method set forth in claim 1 in which a series of such sleeves are placed over the blow core in successive cycles of parison forming.

6. The method set forth in claim 1 in which the sleeve is laminated.

7. The method set forth in claim 1 in which the material of said sleeve is more resistant to fluids than the organic plastic material of the article adjacent said sleeve material.

8. The method set forth in claim 1 in which said material of the sleeve is selected from the group consisting of polymers of vinyl chloride, vinylidine chloride, acrylonitrile, methacryl-nitrile, and nylon.

9. The method set forth in claim 1 in which the material of said sleeve and the material of the organic plastic material surrounding said sleeve are of different colors.

10. The method as set forth in claim 1 in which the material of the sleeve is treated prior to the molding step for improving its adhesion to the layer of organic plastic material.

11. The method set forth in claim 1 in which the sleeve and plastic layer are composed of different organic plastic materials.

12. The method set forth in claim 1 in which the sleeve is formed with side and end portions and the end portion is reenforced.

13. The method set forth in claim 12 in which one of said layers has a discontinuity which is covered by the other of said layers.

14. In the method of making a hollow article of organic plastic material wherein a parison is formed around a core in a parison mold having a mold cavity, by molding the organic plastic material around the core in said cavity and wherein the parison is subsequently expanded in a blow mold, the improvement which comprises the steps of preforming a sleeve which is capable of conforming to the core to prevent direct contact between said core and substantially all of the organic plastic material being molded therearound, applying the preformed sleeve to the core prior to molding the organic plastic material in said mold cavity and pressure molding the organic plastic material around the sleeve and core in the parison mold substantially enclosing said sleeve and in intimate contact therewith to form a composite parison consisting of an inner sleeve and of an outer layer of organic plastic material adhering thereto, bringing said inner sleeve to a temperature at which it is capable of being expanded together with said outer layer, at least in part by means of said outer layer, introducing said inner sleeve and outer layer into a blow mold in said heated state, and expanding said sleeve and layer in unison by means of a pressure fluid in a blow mold to form a multilayered hollow article.

15. The method set forth in claim 14 in which the core is heated and the sleeve is heated at least in part by heat transfer from the core.

16. The method set forth in claim 14 in which the core is heated and the sleeve is heated by heat transfer from the heated core and from the pressure molded layer of organic plastic material.

References Cited
UNITED STATES PATENTS

| | | | |
|---|---|---|---|
| 3,415,916 | 12/1968 | Valyi | 264—97 |
| 3,247,550 | 4/1966 | Haines, Jr. | 264—275 X |
| 2,710,987 | 6/1955 | Sherman | 264—97 |
| 3,002,231 | 10/1961 | Walker et al. | 264—255 X |
| 1,896,123 | 2/1933 | Schweitzer | 264—255 X |

ROBERT F. WHITE, Primary Examiner

J. H. SILBAUGH, Assistant Examiner

U.S. Cl. X.R.

264—92, 97, 247, 250, 255, 265, 278, 306; 425—129, 324 B